United States Patent
Ito (10) Patent No.: US 10,409,025 B2
(45) Date of Patent: Sep. 10, 2019

(54) OPTICAL APPARATUS WITH ROTATIONAL OPERATING MEMBER

(71) Applicant: CANON KABUSHIKI KAISHA, Tokyo (JP)

(72) Inventor: Hiroki Ito, Hiratsuka (JP)

(73) Assignee: Canon Kabushiki Kaisha, Tokyo (JP)

( * ) Notice: Subject to any disclaimer, the term of this patent is extended or adjusted under 35 U.S.C. 154(b) by 101 days.

(21) Appl. No.: 15/676,508

(22) Filed: Aug. 14, 2017

(65) Prior Publication Data
US 2018/0059387 A1 Mar. 1, 2018

(30) Foreign Application Priority Data

Aug. 24, 2016 (JP) ................... 2016-163731

(51) Int. Cl.
| | | |
|---|---|---|
| *G02B 7/04* | (2006.01) | |
| *G02B 15/15* | (2006.01) | |
| *G02B 7/10* | (2006.01) | |
| *G02B 7/02* | (2006.01) | |
| *G02B 7/09* | (2006.01) | |

(52) U.S. Cl.
CPC ............ *G02B 7/04* (2013.01); *G02B 7/023* (2013.01); *G02B 7/09* (2013.01); *G02B 7/10* (2013.01); *G02B 15/15* (2013.01)

(58) Field of Classification Search
CPC .......... G02B 7/02; G02B 7/021; G02B 7/022; G02B 7/023; G02B 7/04; G02B 7/08; G02B 7/09; G02B 7/10; G02B 7/102
USPC ....... 359/696–704, 819, 821, 822, 823, 824, 359/825, 826
See application file for complete search history.

(56) References Cited

U.S. PATENT DOCUMENTS

| | | | | | |
|---|---|---|---|---|---|
| 2,908,209 | A | * | 10/1959 | Marvin ................ | G02B 7/021 359/740 |
| 4,303,306 | A | * | 12/1981 | Ookawa ................ | G02B 7/026 285/921 |
| 5,285,322 | A | * | 2/1994 | Horning ................ | G02B 7/10 359/700 |
| 5,555,480 | A | * | 9/1996 | Tanaka ................ | G02B 7/026 359/811 |

(Continued)

FOREIGN PATENT DOCUMENTS

JP 2015-031774 A 2/2015

*Primary Examiner* — Nicholas R. Pasko
(74) *Attorney, Agent, or Firm* — Cowan, Liebowitz & Latman, P.C.

(57) ABSTRACT

An optical apparatus which has a lens movable forward or backward in a direction of an optical axis through operation of an operating member, prevents unintended motions in the lens, and improves operating quality of the operating member at low cost. A fixing member rotatably holds the operating member and has a first contact surface coming into contact with a pressing member sandwiched between the operating member and the fixing member. The operating member rotatable about the optical axis moves an image pickup optical system in the direction of the optical axis and has a second contact surface facing the first contact surface and coming into contact with the pressing member. The pressing member applies pressing force as load on the operating member to the operating member. The first or second contact surface has a slope that changes the pressing force according to a rotational angle of the operating member.

9 Claims, 10 Drawing Sheets

(56) References Cited

U.S. PATENT DOCUMENTS

| | | | | |
|---|---|---|---|---|
| 5,719,709 A | * | 2/1998 | Kodaka | G02B 7/10 359/694 |
| 7,054,073 B2 | * | 5/2006 | Shirie | G02B 7/08 353/100 |
| 7,436,607 B1 | * | 10/2008 | Gao | G02B 7/04 359/696 |
| 7,649,695 B2 | * | 1/2010 | Koyama | G02B 7/10 359/698 |
| 2015/0036039 A1 | * | 2/2015 | Nagao | G02B 7/10 348/345 |

* cited by examiner

OPTICAL APPARATUS WITH ROTATIONAL OPERATING MEMBER

BACKGROUND OF THE INVENTION

Field of the Invention

The present invention relates to an optical apparatus with a rotational operating member.

Description of the Related Art

When a zooming operation is performed with an image pickup apparatus, which is equipped with a lens barrel having a heavy zoom lens group, pointing upward or downward, unintended zooming may occur due to lens' own weight, causing an actual composition to differ from an intended composition. To prevent such unintended zooming, there is known an arrangement in which an operating member for performing a zooming operation is urged using an elastic member to apply torque acting as a brake. However, when the operating member is urged using the elastic member, large force is required to perform the zooming operation. Particularly when the heavy zoom lens group is driven using a cam mechanism in zooming, a problem arises due to operating quality compromised in an area where large operating force is required such as an area where cams are steep.

One of technique to solve this problem has been proposed in, for example, Japanese Laid-Open Patent Publication (Kokai) No. 2015-31774. In an optical apparatus described in Japanese Laid-Open Patent Publication (Kokai) No. 2015-31774, a variable magnification lens group or a focusing lens group is moved forward or backward in a direction of an optical axis by rotationally operating a rotational operating ring. At this time, appropriate operating torque is obtained by a user adjusting an amount by which an elastic member placed between the rotational operating ring and a fixing member is displaced.

However, the adjusting mechanism for the operating force on the rotational operating ring as described in Japanese Laid-Open Patent Publication (Kokai) No. 2015-31774 causes the operating force on the rotational operating ring to change over the whole operating range when the amount of displacement of the elastic member is adjusted. For this reason, areas where different operating forces are required exist within the whole operating range of the rotational operating ring, and this compromises operating quality. Moreover, the adjusting mechanism described in Japanese Laid-Open Patent Publication (Kokai) No. 2015-31774 has a problem of high cost due to a complicated structure required to displace the elastic member.

SUMMARY OF THE INVENTION

The present invention provides an optical apparatus which is equipped with a lens capable of being moved forward or backward in a direction of an optical axis by operating a rotational operating member, prevents unintended motions from occurring in the lens, and improves operating quality of the rotational operating member at low cost.

Accordingly, the present invention provides an optical apparatus comprising an operating member configured to be rotationally operated about an optical axis of an image pickup optical system, thereby moving the image pickup optical system in a direction of the optical axis, a fixing member configured to rotatably hold the operating member, and a pressing member configured to be sandwiched between the operating member and the fixing member and apply pressing force acting as load on a rotational operation of the operating member to the operating member, wherein the fixing member has a first contact surface that comes into contact with the pressing member, the operating member has a second contact surface that is provided in opposed relation to the first contact surface and comes into contact with the pressing member, and one of the first contact surface and the second contact surface has a slope that changes the pressing force of the pressing member according to a rotational angle of the operating member.

According to the present invention, the optical apparatus equipped with the lens capable of being moved forward or backward in the direction of the optical axis by operating the rotational operating member prevents unintended motions from occurring in the lens and improves operating quality of the rotational operating member at low cost.

Further features of the present invention will become apparent from the following description of exemplary embodiments (with reference to the attached drawings).

DESCRIPTION OF THE EMBODIMENTS

Hereafter, embodiments of the present invention will be described in detail with reference to the drawings. In the following description of the embodiments, a lens barrel which an image pickup apparatus such as a digital camera has is taken as an example of an optical apparatus according to the present invention, but the optical apparatus according to the present invention is not limited to this.

Figure 1A:
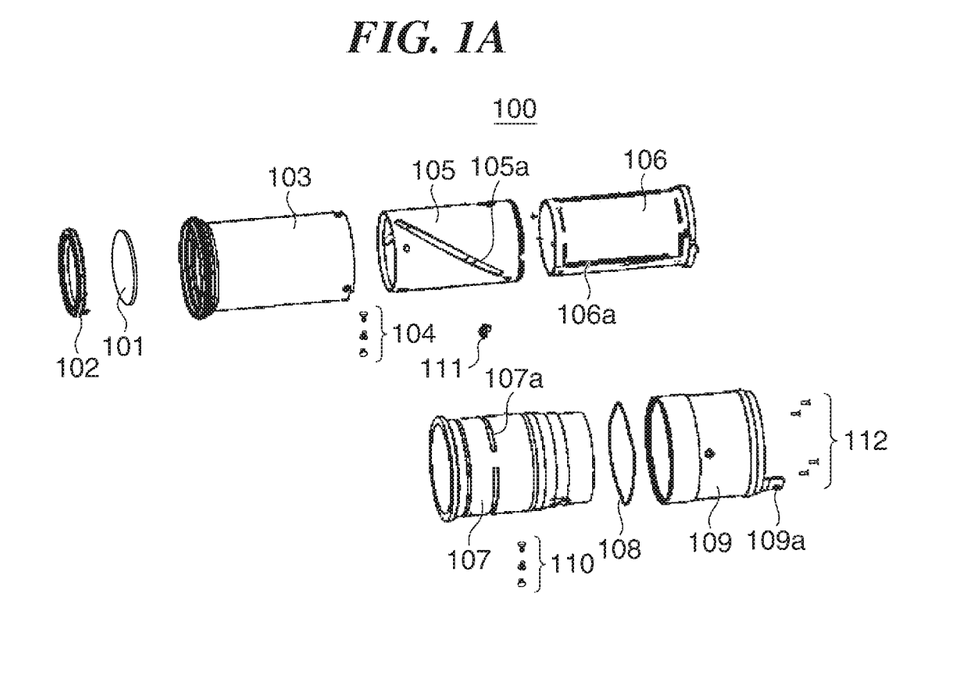
FIGS. 1A and 1B are schematic views useful in explaining an arrangement of a lens barrel according to a first embodiment.
Figure 1B:
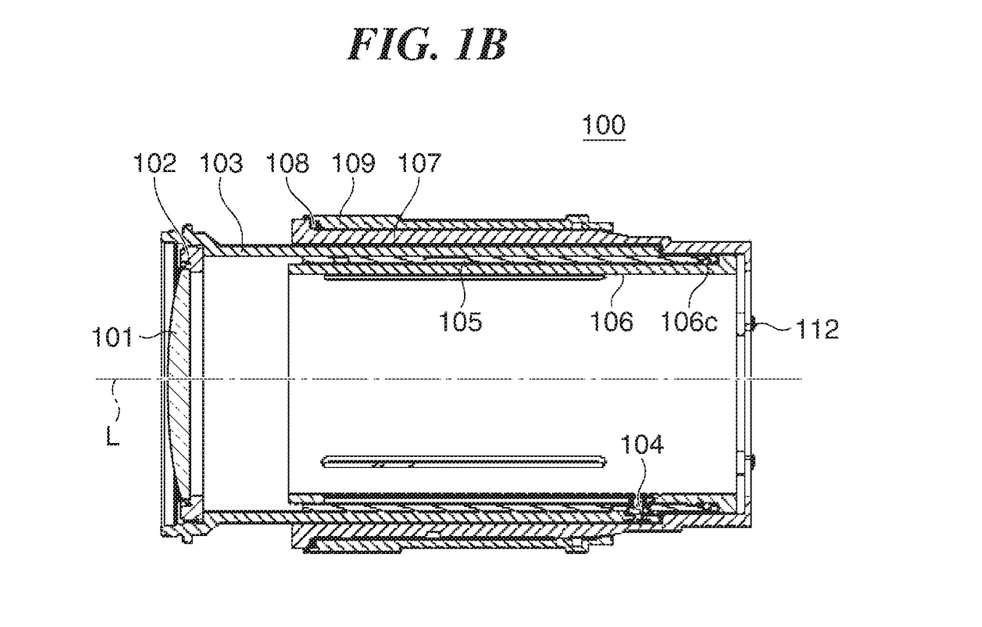

A description will now be given of the first embodiment of the present invention. FIG. 1A is an exploded perspective views showing a lens barrel 100 according to the first embodiment of the present invention. FIG. 1B is a cross-sectional view showing the lens barrel 100. The lens barrel 100 has a lens group 101, a lens holding member 102, a holding cylinder 103, engaging members 104, a guide member 105, a straight-ahead guide member 106, a fixing member 107, a pressing member 108, and a rotational operating member 109 (hereafter referred to "the operating member 109").

The lens group 101 is an element constituting an image pickup optical system of the lens barrel 100 and held by the lens holding member 102. The lens holding member 102 holds the lens group 101 and is fixed to the holding cylinder 103. In the lens barrel 100, the operating member 109 is rotationally operated, causing the holding cylinder 103 to move in a direction of an optical axis of the lens group 101 (an axial direction of an optical axis L) to move the lens group 101 in the direction of the optical axis although details of this mechanism will be described later. It should be noted that the lens holding member 102 and the holding cylinder 103 may be configured as an integral component (holding member).

The engaging members 104 are attached to the holding cylinder 103. The guide member 105 has guide grooves 105a each of which has a substantially uniform width, and the straight-ahead guide member 106 has straight-ahead grooves 106a. In the present embodiment, the guide grooves 105a are formed in a cylindrical wall portion of the guide member 105 at equal intervals of 120 degrees in three phases, and the straight-ahead grooves 106a as well are formed in a cylindrical portion of the straight-ahead guide member 106 at equal intervals of 120 degrees in three phases. The engaging members 104 attached to the holding cylinder 103 are engaged with the guide grooves 105a and the straight-ahead grooves 106a. The straight-ahead guide member 106 is fastened to the fixing member 107 by screw members 112. The guide member 105 is fitted on an outer diameter portion of the straight-ahead guide member 106 via a bayonet portion 106c. As a result, the guide member 105 is held by the straight-ahead guide member 106 in a state of being rotatable with the optical axis L at a center of rotation (a state of being rotatable about the optical axis L).

The pressing member 108 is a ring-shaped leaf spring and sandwiched by the fixing member 107 and the operating member 109 in the direction of the optical axis. In the following description, a surface of the fixing member 107 which comes into contact with the pressing member 108 is referred to as a first contact surface, and a surface of the operating member 109 which comes into contact with the pressing member 108 is referred to as a second contact surface for the sake of convenience. Detailed description of the first contact surface and the second contact surface will be given later.

The operating member 109 is mounted on the fixing member 107 via a groove portion 107a, which is formed in a circumferential direction of the fixing member 107, using pin members 110 such that the operating member 109 is rotatable about the optical axis with respect to the fixing member 107 while being restrained from moving in the direction of the optical axis. The operating member 109 has a connecting portion 109a and is connected to a rotation restraining member 111 via the connecting portion 109a. The rotation restraining member 111 is fixed to the guide member 105. Thus, when a user rotates the operating member 109 about the optical axis, the guide member 105 as well rotates about the optical axis in synchronization with the rotation of the operating member 109. At this time, since the engaging members 104 engaged with the guide grooves 105a are in engagement with the straight-ahead guide grooves 106a of the straight-ahead guide member 106 as well, the rotation of the guide member 105 causes the holding cylinder 103, to which the engaging members 104 are attached, to move forward or backward along the straight-ahead guide grooves 106a without rotating. The lens group 101 held by the holding cylinder 103 via the lens holding member 102 is thus moved in the direction of the optical axis.

Figure 2A:
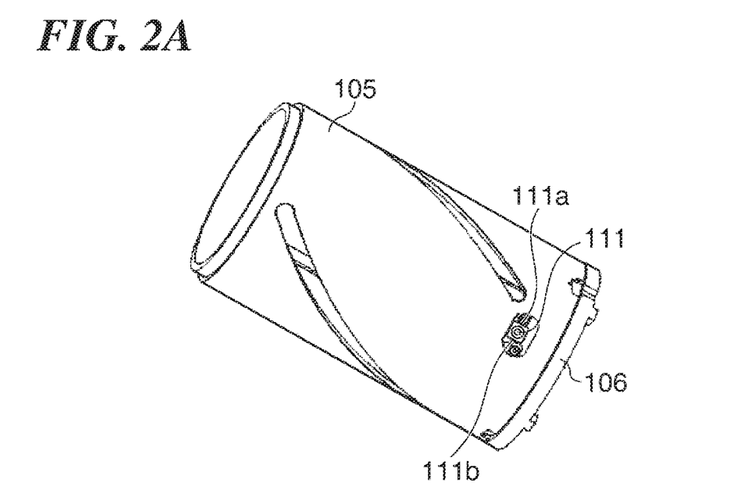
FIGS. 2A to 2C are first views showing a state in which some components constituting the lens barrel are put together.
Figure 2B:
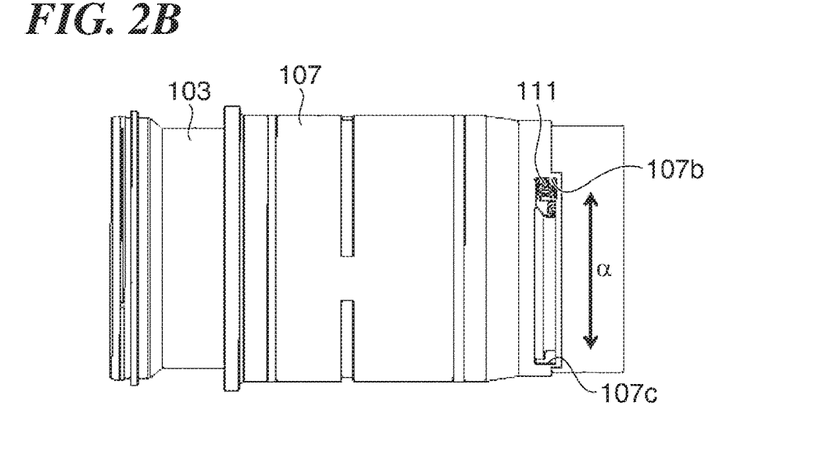
Figure 2C:
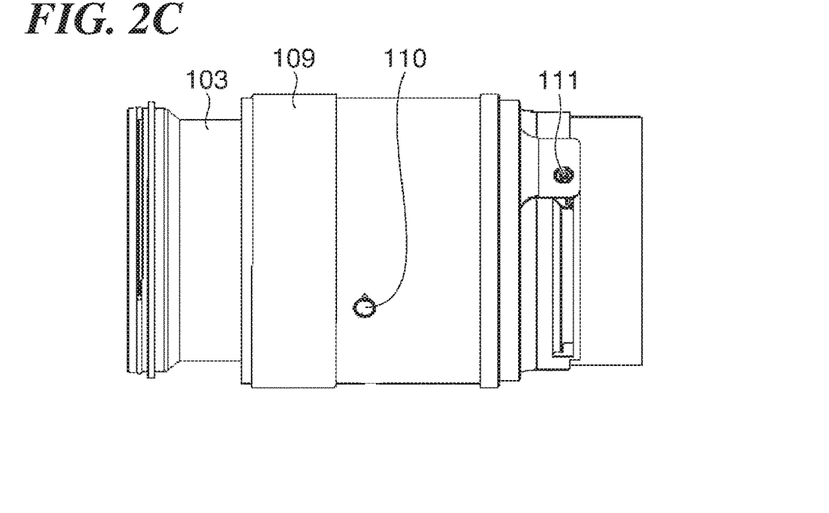

FIG. 2A is a perspective view showing a state in which the guide member 105, the straight-ahead guide member 106, and the rotation restraining member 111 have been put together. FIG. 2B is a side view showing an arrangement of the components of the lens barrel 100 except the pressing member 108 and the operating member 109. FIG. 2C is a side view showing the operating member 109 is added to the arrangement in FIG. 2B using the pin members 110.

As described earlier, the guide member 105 is rotatable with respect to the straight-ahead guide member 106 fastened to the fixing member 107, and the rotation restraining member 111 connects the guide member 105 and the operating member 109 together. Thus, when the user rotates the operating member 109 about the optical axis, the guide member 105 as well rotates about the optical axis. Here, a groove portion with a predetermined length, which has a first end portion 107b and a second end portion 107c at its respective ends, is formed in the fixing member 107 in a circumferential direction. With the holding cylinder 103 retracted into an inner peripheral portion of the fixing member 107 to the maximum extent possible, a first abutment portion 111a of the rotation restraining member 111 abuts against the first end portion 107b provided in the fixing member 107. With the holding cylinder 103 protruded from the fixing member 107 to the maximum extent possible, a second abutment portion 111b of the rotation restraining member 111 abuts against the second end portion 107c provided in fixing member 107. Namely, an angle through which the guide member 105 is rotatable is limited to a predetermine angle α indicated in FIG. 2B, and hence an angle through which the operating member 109 is rotatable as well is limited to the predetermine angle α.

Figure 3:
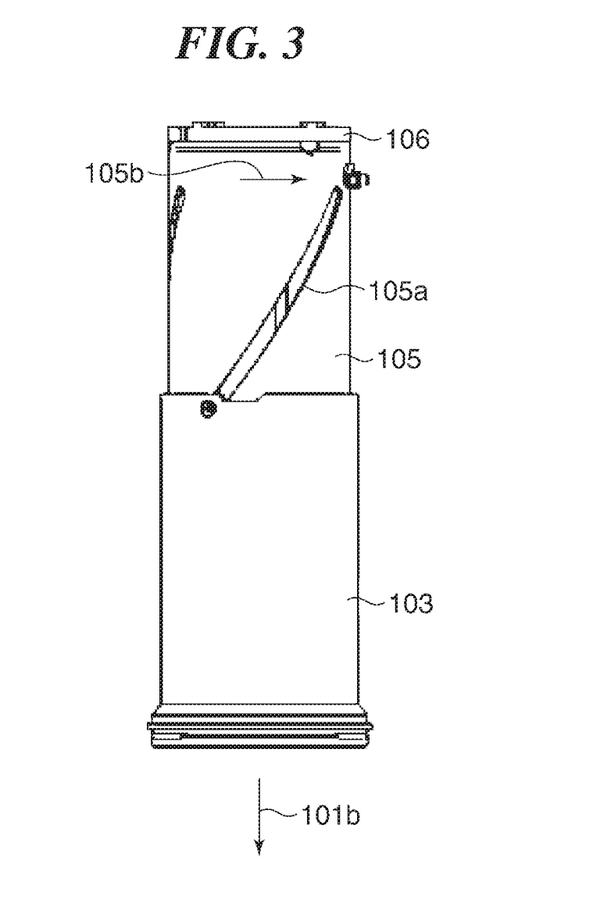
FIG. 3 is a second view showing a state in which some components constituting the lens barrel are put together.

FIG. 3 is a side view showing a state in which the guide member 105, the straight-ahead guide member 106, and the holding cylinder 103 are put together, and the holding cylinder 103 is protruded from the guide member 105. It should be noted that the lens group 101, the lens holding member 102, and the engaging members 104 are attached to the holding cylinder 103 although reference symbols for them are omitted from FIG. 3. An arrow 101b in FIG. 3 indicates a vertical downward direction (a direction in which gravity acts).

Self weight of the lens group 101, the lens holding member 102, and the holding cylinder 103 acts in the direction of the arrow 101b, and hence such a force causing the holding members 103 and others to try to move in the direction of the arrow 101b and along the straight-ahead grooves 106a provided in the straight-ahead guide member 106 is generated in the holding members 103 and others. When moving along the straight-ahead grooves 106a in the direction of the arrow 101b, the engaging members 104 engaged with the guide groove 105a and the straight-ahead groove 106a cause the guide member 105 to rotate along the guide groove 105a in a direction of an arrow 105b. Thus, with this arrangement as it is, if, for example, the user performs shooting with the optical axis pointing downward, the lens group 101 would move due to its own weight, making it difficult to perform shooting while holding the lens group 101 at an appropriate position on the optical axis L. To solve this problem, the lens barrel 100 is configured such that brake torque which prevents rotation of the guide member 105 is provided by frictional force arising from pressing force of the pressing member 108 sandwiched between the operating member 109 and the fixing member 107.

Figure 4A:
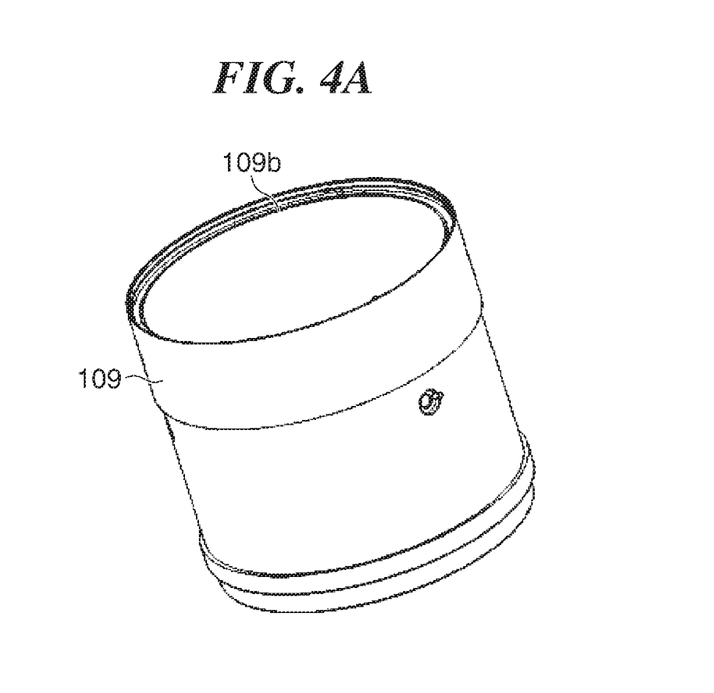
FIGS. 4A and 4B are views showing an arrangement of an operating member constituting the lens barrel.
Figure 4B:
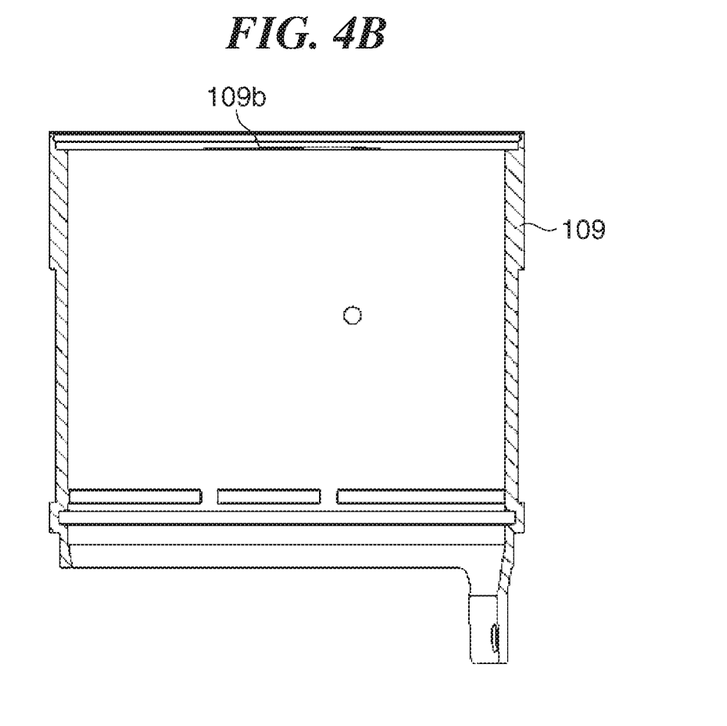

A description will now be given of how the brake torque which prevents rotation of the guide member 105 is provided by the pressing force of the pressing member 108. FIG. 4A is a perspective view showing the operating member 109. FIG. 4B is a cross-sectional view showing the operating member 109. The operating member 109 has the second contact surface 109b which comes into contact with the pressing member 108. The second contact surface 109b has slopes 109c (see FIG. 6A) which cross a surface perpendicular to the optical axis L at a predetermined angle.

Figure 5A:
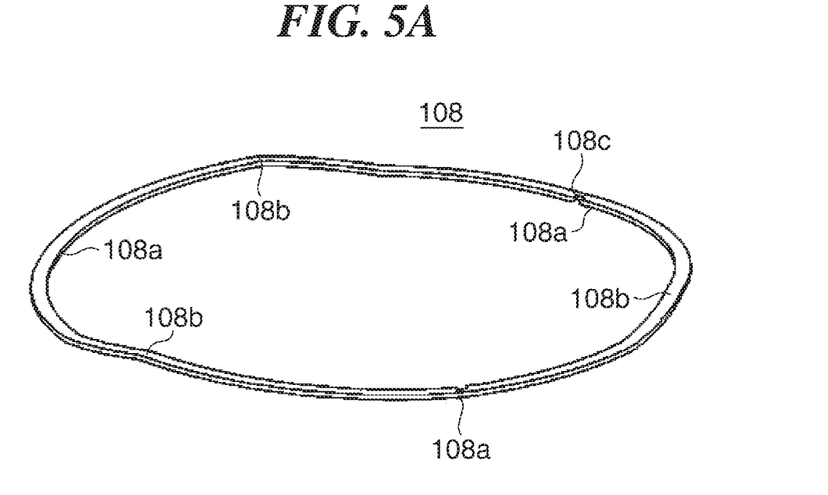
FIGS. 5A and 5B are views showing an arrangement of a pressing member constituting the lens barrel.
Figure 5B:
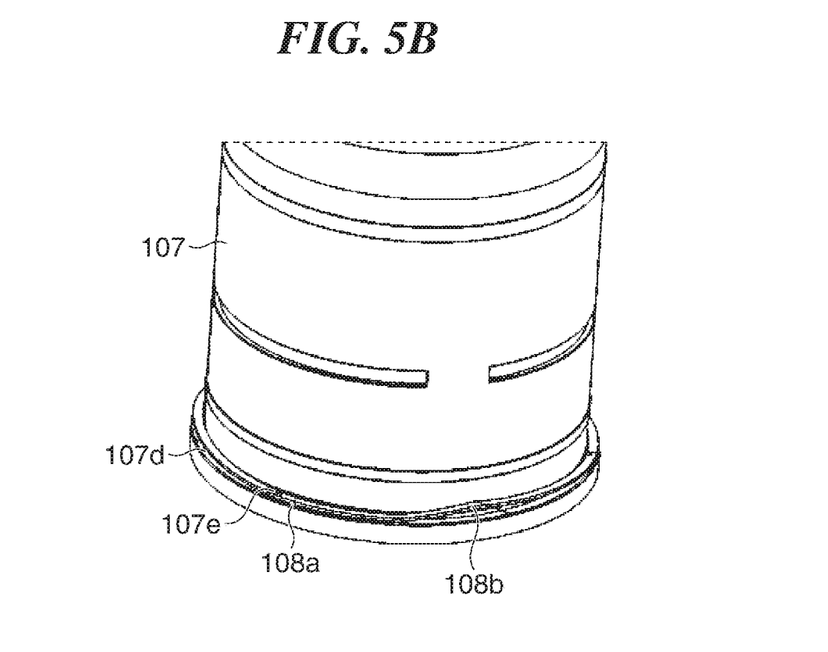

FIG. 5A is a perspective view showing the pressing member 108. FIG. 5B is a perspective view showing a state in which the pressing member 108 incorporated into the fixing member 107. The pressing member 108 has first contact portions 108a, second contact portion 108b, and a connecting portion 108c. The first contact portions 108a come into contact with the first contact surface 107d of the fixing member 107, and the second contact portions 108b come into contact with the second contact surface 109b of the operating member 109. It should be noted that the first contact surface 107d is substantially parallel to the surface perpendicular to the optical axis L. The connecting portion 108c is fixed to a key portion 107e provided in the fixing member 107, and this restrains the pressing member 108 from rotating about the optical axis. It should be noted that in the present embodiment, the first contact portion 108a and the second contact portion 108b are each provided at three locations.

Figure 6A:
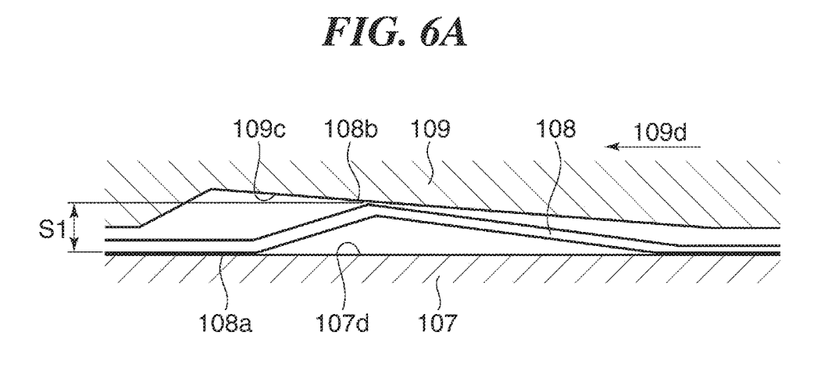
FIGS. 6A and 6B are views showing a relationship among the pressing member, a fixing member, and the operating member which constitute the lens barrel.

FIG. 6A is a developed view showing a partial arrangement of the pressing member 108 sandwiched between the fixing member 107 and the operating member 109. The key portion 107e and the connecting portion 108c prevent the fixing member 107 and the pressing member 108 from rotating about the optical axis relatively to each other. On the other hand, the operating member 109 is rotatable through user's operation within the range of the angle α defined by the first end portion 107b and the second end portion 107c of the fixing member 107.

The second contact surface 109b of the operating member 109 comes into contact with the second contact portions 108b of the pressing member 108. Thus, the pressing member 108 is sandwiched between the first contact surface 107d of the fixing member 107 and the second contact surface 109b of the operating member 109 and elastically deformed in the direction of the optical axis to apply pressing force to the operating member 109 and the fixing member 107. The pressing force applied by the pressing member 108 acts on the second contact surface 108b to generate torque that makes it difficult for the operating member 109 to move due to frictional force generated in the second contact portion 108b. For example, rotating the operating member 109 in a direction of an arrow 109d in FIG. 6A narrows a space S between the fixing member 107 and the operating member 109. This causes the pressing member 108 to be elastically deformed in such a way as to be further crushed in the direction of the optical axis and thus apply pressing force with greater torque to the operating member 109. Therefore, by varying the space S1 according to an operating range of the operating member 109, torque that makes it difficult for the operating member 109 to move is freely generated.

Figure 6B:
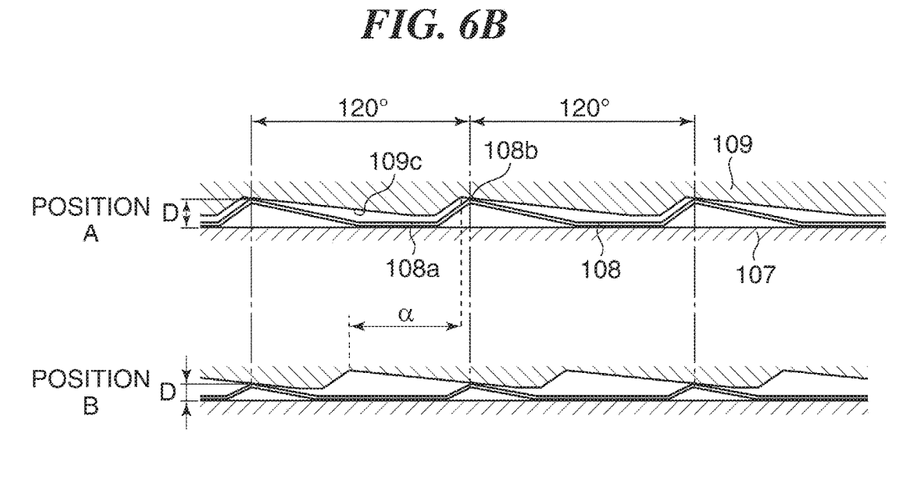

FIG. 6B is a developed view showing an arrangement of the pressing member 108 all around its entire perimeter, the pressing member 108 being sandwiched between the fixing member 107 and the operating member 109. A position A in an upper row shows a state in which the first abutment portion 111a of the rotation restraining member 111 lies at a position being abutment against the first end portion 107b of the fixing member 107. A position B in a lower row shows a state in which the second abutment portion 111b of the rotation restraining member 111 lies at a position in abutment against the second end portion 107c of the fixing member 107. In the present embodiment, the angle α through which the operating member 109 is rotatable is set at 90 degrees (°). On the other hand, the three second contact portions 108b provided in the pressing member 108 lie at three positions at equal intervals of 120 degrees in a circumferential direction.

Supposing that the angle α is 120 degrees or more, one of the slopes 109c which is in contact with one of the second contact portion 108b passes another one of the second contact portions 108b while the operating member 109 is moving from the position A to the position B. In this case, a height D of the pressing member 108 with respect to the rotational angle of the operating member 109 varies greatly while the second contact portion 108b moves along a sharply sloped portion between the second contact portion 108b and the neighboring slopes 109c. For this reason, appropriate brake torque for the rotational angle of the operating member 109 cannot be generated. On the other hand, in the present embodiment, an angle obtained by multiplying the number of second contact portions 108b by the angle α is configured to be smaller than 360 degrees. In this case, whenever the operating member 109 is rotated within the range of the angle α, one of the second contact portion 108b is kept in contact with one of the slopes 109c. Thus, an amount of change in the height D of the pressing member 108 with respect to the rotational angle of the operating member 109 is adjustable according to inclinations of the slopes 109c, and therefore, it is possible to generate brake torque according to the rotational angle of the operating member 109.

Figure 7A:
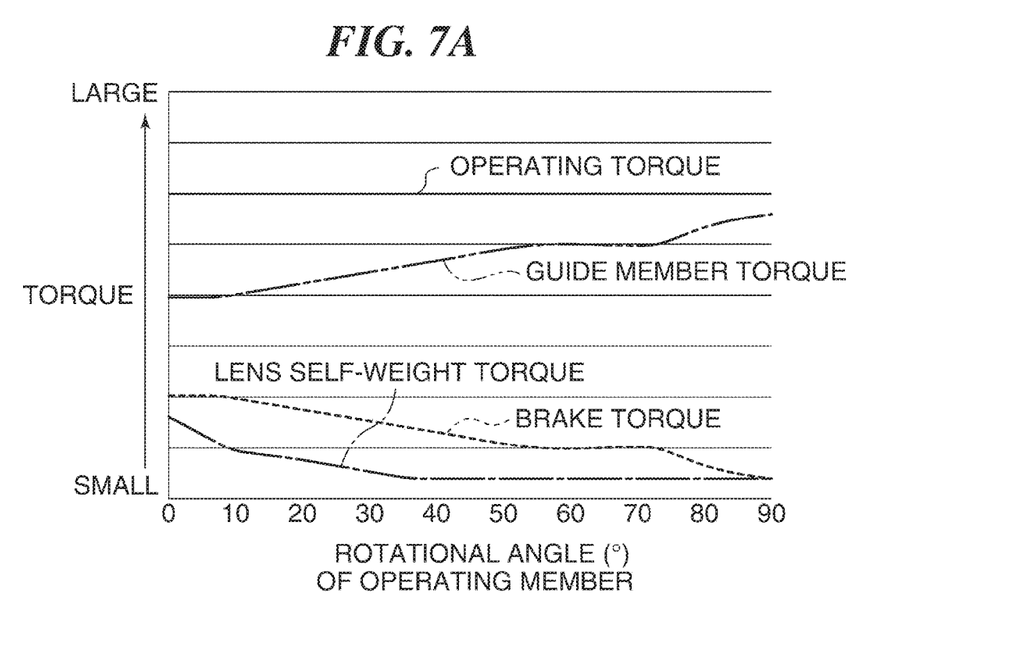
FIGS. 7A and 7B are diagrams useful in explaining a relationship among a variety of torque generated in the lens barrel.

FIG. 7A is a graph showing a relationship between a variety of torque generated in the lens barrel 100 and rotational angles of the operating member 109. Torque which acts as resistance when the guide member 105, the engaging members 104, the lens group 101, the lens holding member 102, and the holding cylinder 103 which are put together are moved in the direction of the optical axis while being horizontally held is referred to as "guide member torque". Torque that causes the rotation restraining member 111 to rotate along the guide grooves 105a due to its own weight when the guide member 105, the engaging members 104, the lens group 101, the lens holding member 102, and the holding cylinder 103 which are put together as above are held downward is referred to as "lens self-weight torque". Torque applied with the brake torque when the guide member 105, the engaging members 104, the lens group 101, the lens holding member 102, and the holding cylinder 103 which are put together as above are further combined with the fixing member 107, the operating member 109, and the pressing member 108 acts as "operating torque" on the operating member 109. It should be noted that as described earlier, the brake torque is generated by the pressing member 108 and intended to restrain rotation of the operating member 109.

Figure 7B:
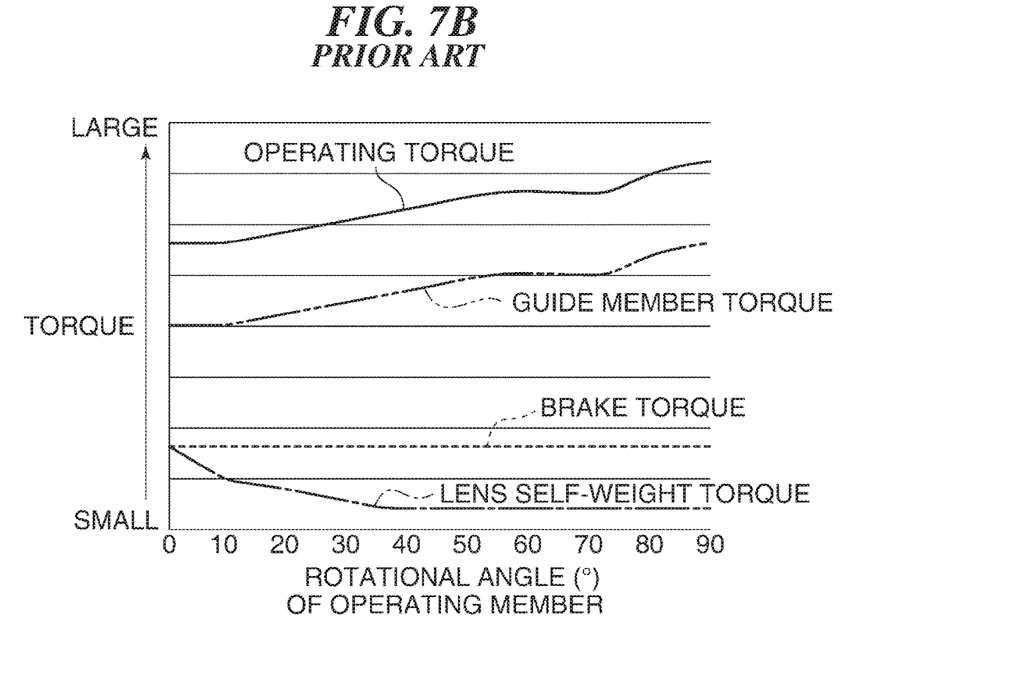

FIG. 7B is a graph showing a relationship among the operating torque, the guide member torque, the brake torque, and the lens self-weight torque in the lens barrel according to the prior art. According to the prior art, the lens self-weight torque reaches its peak when the rotational angle is approximately 0 (zero). For this reason, the brake torque that prevents rotation of the operating member due to self weight of the lens group in an operating range where the lens self-weight torque reaches its peak is required. However, uniformly applying the brake torque over the whole operating range causes variations in the guide member torque to directly present themselves as variations in the operating torque since the guide member torque varies according to the rotational angle of the operating member 109, causing degradation of operating quality.

On the other hand, as shown in FIG. 7A, in the lens barrel 100 according to the present embodiment, the brake torque is applied according to the rotational angle (operating range) of the operating member 109. Since the brake torque is suitably applied according to the lens self-weight torque and the guide member torque, the operating torque is smoothed. Namely, in the lens barrel 100, the operating torque is substantially uniform with parts count reduced as compared to the conventional arrangement, and even at low cost, operating quality is improved over the whole operating range of the operating member 109.

Figure 8:
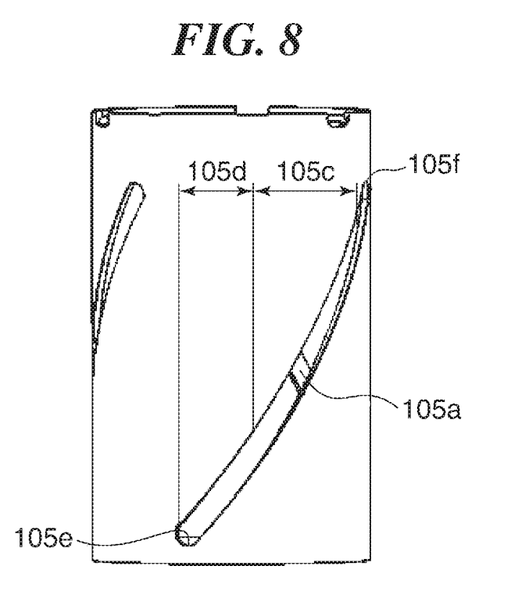
FIG. 8 is a side view showing an arrangement of a guide member constituting the lens barrel.

A description will now be given of an arrangement of the guide member 105 intended to further reduce variations in the operating torque of the operating member 109. FIG. 8 is a side view showing the guide member 105. The guide grooves 105a provided in the guide member 105 each have an area 105c that is a groove portion in which the amount of advance in the direction of the optical axis is large with respect to the rotational angle of the guide member 105 and which forms a steep angle with the optical axis, and an area 105d that is a groove portion in which the amount of advance in the direction of the optical axis is small with respect to the rotational angle of the guide member 105 and which forms a gentle angle with the optical axis. Torque that rotates the guide member 105 when the image pickup apparatus with the lens barrel 100 is held vertically downward is greater in the area 105c than in the area 105d. On the other hand, the brake torque that acts as load on rotation of the operating member 109 is variable with rotational angles of the operating member 109 as described earlier. For this reason, according to a cam angle which the guide grooves 105a form with the optical axis, required brake torque is applied to the operating member 109. At the same time, the operating torque is substantially constant while variations in the operating torque are reduced over the whole operating range of the operating member 109.

It should be noted that as a method of forming the guide groove 105a using a cutting tool, a method comprised of forming a hole at a cutting start position, starting cutting from this hole using the cutting tool to form the guide groove 105a, turning the cutting tool around at an end of the guide groove 105a, and returning the cutting tool to the cutting start position is used. One end of the guide groove 105a which is the cutting starting position is referred to as a first end 105e, and the other end of the guide groove 105a at which the cutting tool is turned around is referred to as a second end 105f. In this case, when turning around at the second end 105f, the cutting tool slows down and stays there for a prolonged time. This causes the groove width of the guide groove 105a to be greater on the second end 105f side than on the first end 105e side. Thus, when the engaging members 104 are configured to be slidably fitted in the guide groove 105a, sliding load (frictional force) may be small in an area close to the second end 105f side on which the groove width of the guide groove 105a is greater, causing the operating torque to be uneven. To address this problem, the pressing force of the pressing member 108 which is determined by the slopes 109c of the operating member 109 is increased in a direction in which the engaging member 104 moves from the first end 105e toward the second end 105f. This prevents unevenness (partial variations) from being developed in the operating torque.

Although in the arrangement described above, the pressing member 108 is fixed to the fixing member 107, and the operating member 109 has the second contact surface 109b having the slopes 109c, the arrangement may be reversed. Specifically, the operating member 109 is provided with a ring-shaped surface substantially perpendicular to the optical axis L, the first contact portions 108a of the pressing member 108 are brought into contact with this surface, and the pressing member 108 is fixed to the operating member 109 so as to restrain rotation about the optical axis L. Also, the fixing member 107 is provided with a ring-shaped surface substantially perpendicular to the optical axis L, and this surface is provided with slopes that come into contact with the second contact portions 108b of the pressing member 108. Even if the pressing member 108 is thus configured to be sandwiched between the fixing member 107 and the operating member 109, the same effects as those achieved by the embodiment described above would be achieved.

A description will now be given of a second embodiment of the present invention. In the first embodiment, the pressing member 108 is elastically deformed in the direction of the optical axis to apply its pressing force to the operating member 109, whereas in the second embodiment, a pressing member is elastically deformed in a radial direction to apply its pressing force to an operating member. As components constituting a lens barrel according to the second embodiment except for the operating member, the pressing member, and a fixing member, the components constituting the lens barrel 100 according to the first embodiment are used, and description of the components same as those of the first embodiment is omitted. It should be noted that in the following description, a surface of the fixing member which comes into contact with the pressing member is referred to as a first contact surface, and a surface of the operating member which comes into contact with the pressing member is referred to as a second contact surface for the sake of convenience as with the first embodiment.

Figure 9:
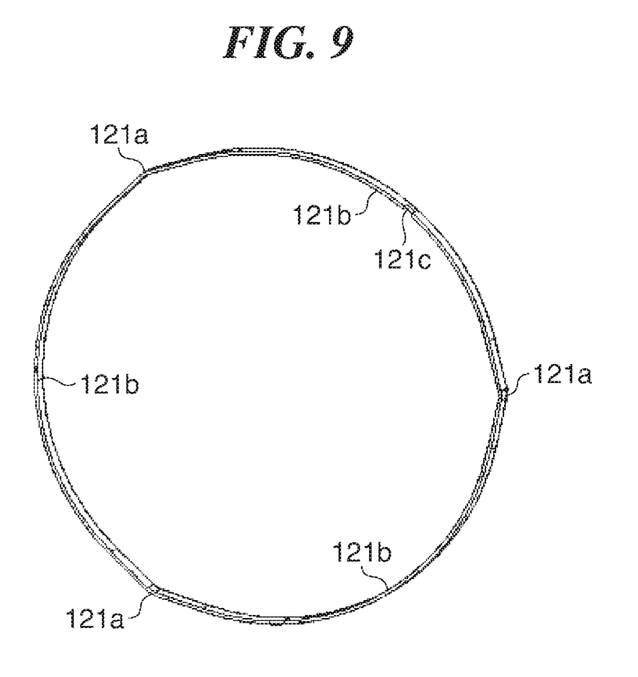
FIG. 9 is a perspective view showing a pressing member constituting a lens barrel according to a second embodiment.

FIG. 9 is a perspective view showing the pressing member 121 constituting the lens barrel according to the second embodiment of the present invention. The pressing member 121 is a ring-shaped leaf spring and has first contact portions 121a, second contact portions 121b, and a connecting portion 121c. The connecting portion 121c is fixed to a key portion 122a provided in the fixing member 122 (see FIG. 10), to be described later, and this restrains rotation of the pressing member 121 about the optical axis. The first contact portions 121a are protruded to an outer diameter side and come into contact with a second contact surface 123a provided in the operating member 123 (see FIG. 11), to be described later. The second contact portions 121b come into contact with a first contact surface 122b (see FIG. 10) provided in fixing member 122. It should be noted that in the present embodiment as well, the first contact portion 121a and the second contact portions 121b are each provided at three locations and at substantially regular intervals in a circumferential direction.

Figure 10:
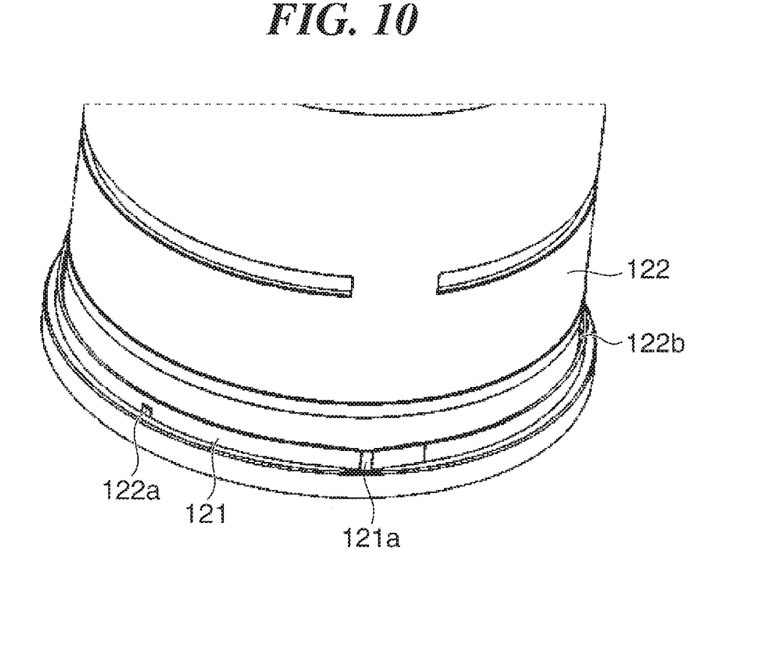
FIG. 10 is a perspective view showing arrangements of a fixing member and the pressing member which constitute the lens barrel according to the second embodiment.
Figure 11:
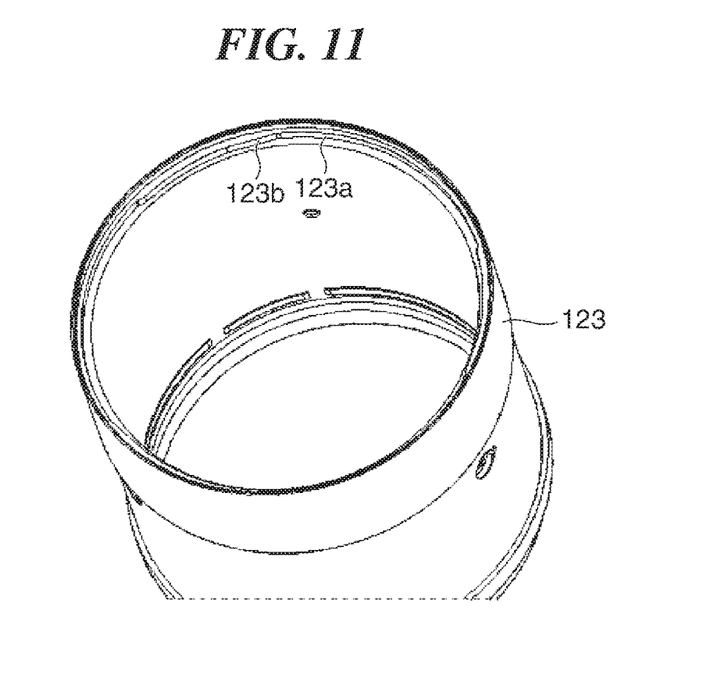
FIG. 11 is a perspective view showing an operating member constituting the lens barrel according to the second embodiment.

FIG. 10 is a perspective view showing a state in which the pressing member 121 is incorporated into the fixing member 122 constituting the lens barrel according to the second embodiment. The first contact surface 122b formed in a cylindrical shape in the fixing member 122 comes into contact with the second contact portions 121b of the pressing member 121. The connecting portion 121c of the pressing member 121 is fixed to the key portion 122a provided in the fixing member 122. FIG. 11 is a perspective view showing the operating member 123 constituting the lens barrel according to the second embodiment. The operating member 123 has the second contact surface 123a having slopes 123b, and the second contact surface 123a comes into contact with the first contact portions 121a of the pressing member 121. The slopes 123b are formed in a circumferential direction of the operating member 123.

Figure 12A:
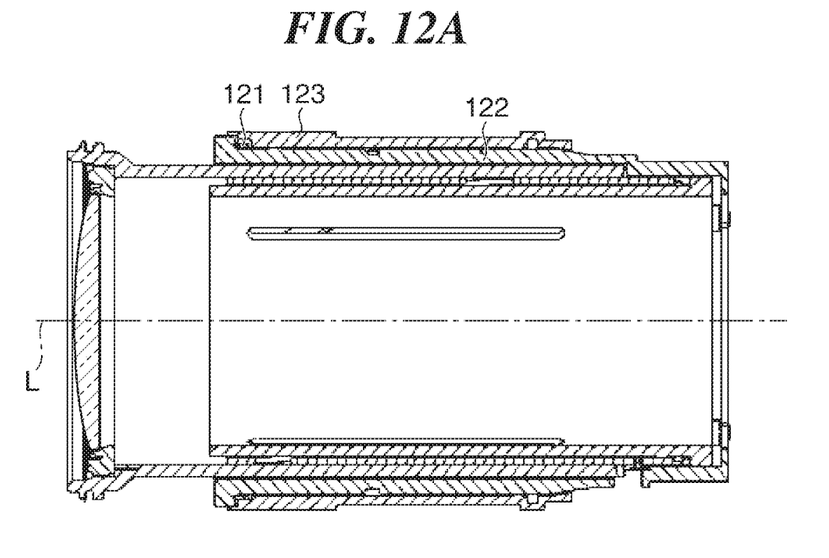
FIGS. 12A and 12B are views showing a state in which the pressing member and the fixing member, which constitute the lens barrel according to the second embodiment, are mounted on the fixing member.
Figure 12B:
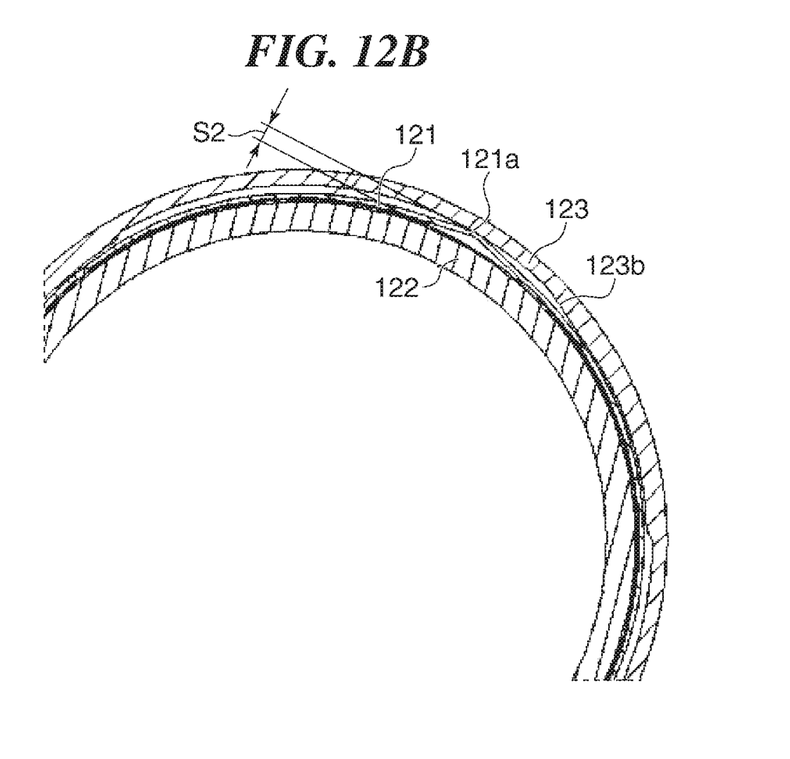

FIG. 12A is a cross-sectional view showing a state in which the operating member 123 and the pressing member 121 are mounted on the fixing member 122, the cross section including the optical axis L. The pressing member 121 is held in a state of being sandwiched between the fixing member 122 and the operating member 123 in the radial direction as shown in the figure. FIG. 12B is a cross-sectional view showing a state in which the operating member 123 and the pressing member 121 are mounted on the fixing member 122, the cross section being perpendicular to the optical axis L. The pressing member 121 is placed in a space S2 formed between the second contact surface 123a of the operating member 123 and the first contact surface 122b of the fixing member 122 and elastically deformed in the radial direction to apply its pressing force to the first contact surface 122b and the second contact surface 123a. With this arrangement, frictional force is generated in the second contact surface 123a of the operating member 123, and torque (brake torque) that makes it difficult for the operating member 123 to rotate is applied to the operating member 123. Thus, in the second embodiment as well, the operating torque is uniformized over the whole operating range of the operating member 123 by applying the brake torque freely with a low-cost arrangement with low parts count, and also, operating quality of the operating member 123 is improved as with the first embodiment.

It should be noted that although in the arrangement described above, the pressing member 121 is fixed to the fixing member 122, and the operating member 123 has the second contact surface 123a with the slopes 123b, this arrangement may be reversed. Specifically, the shape of the pressing member 121 is changed so that the first contact portion 121a protrudes to an inner diameter side. Also, the operating member 123 is provided with a cylindrical surface (inner peripheral wall) substantially parallel to the optical axis L, and the pressing member 121 is fixed to the operating member 123 so that the second contact surface 123a can be brought into contact with this cylindrical surface, and rotation of the operating member 123 about the optical axis is restrained. A cylindrical surface (outer peripheral wall) of the fixing member 122 which faces the inner peripheral wall of the operating member 123 is provided with slopes which the first contact portions 121a of the pressing member 121 come into contact with. The pressing member 121 is thus sandwiched between the inner peripheral wall of the operating member 123 and the outer peripheral wall of the fixing member 122. This arrangement would achieve the same effects as those achieved by the embodiments described above.

It should be understood that although the preferred embodiments of the present invention have been described in detail, the present invention is not limited to these specific embodiments, but the present invention encompasses various forms without departing from the spirits of the present invention. For example, in the above description of the embodiments, the arrangement that moves the single lens group (lens group 101) forward or backward is taken as an example. The present invention, however, is not limited to this, but the above described mechanism that moves the lens group 101 in the direction of the optical axis may also be applied to an arrangement that moves a plurality of lens groups forward or backward. The optical apparatus according to the present invention should not limitedly be applied to the image pickup apparatus but may also be applied to, for example, a telescope.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-163731, filed Aug. 24, 2016 which is hereby incorporated by reference herein in its entirety.

What is claimed is:
1. An optical apparatus comprising:
an operating member configured to be rotationally operated about an optical axis of an image pickup optical system, thereby moving the image pickup optical system in a direction of the optical axis;

a fixing member configured to rotatably hold the operating member and provided inside of the operating member;

a guide member configured to be coupled to the operating member and rotate about the optical axis in synchronization with rotation of the operating member, and provided inside of the fixing member; and a pressing member configured to be sandwiched between the operating member and the fixing member and apply pressing force acting as load on a rotational operation of the operating member to the operating member, wherein:

the image pickup optical system has a holding member that holds a lens, and an engaging member provided in the holding member, the guide member has a guide groove engaged with the engaging member and moves the holding member forward or backward in the direction of the optical axis in accordance with rotation of the guide member, the fixing member has a first contact surface that comes into contact with the pressing member, the operating member has a second contact surface that is provided in opposed relation to the first contact surface and comes into contact with the pressing member, and one of the first contact surface and the second contact surface has a slope that changes the pressing force of the pressing member according to a rotational angle of the operating member.

2. The optical apparatus according to claim 1, wherein:

the first contact surface and the second contact surface are ring-shaped surfaces perpendicular to the optical axis and provided in the fixing member and the operating member, respectively, and the slope is provided in one of the first contact surface and the second contact surface so as to elastically deform the pressing member in the direction of the optical axis.

3. The optical apparatus according to claim 1, wherein:

the first contact surface and the second contact surface are cylindrical surfaces parallel to the optical axis and provided in the fixing member and the operating member, respectively, and the slope is provided in one of the first contact surface and the second contact surface so as to elastically deform the pressing member in a direction perpendicular to the optical axis.

4. The optical apparatus according to claim 1, wherein the pressing member is fixed to one of the first contact surface and the second contact surface which does not have the slope.

5. The optical apparatus according to claim 1, wherein:

a width of the guide groove, which is perpendicular to a direction in which the engaging member moves, is increased at one end of the guide groove compared to the other end of the guide groove, and the slope is formed such that the pressing force of the pressing member increases in a direction of travel toward the other end of the guide groove to the one end of the guide groove.

6. The optical apparatus according to claim 1, wherein the pressing member is elastically deformed in the direction of the optical axis to apply the pressing force to the operating member.

7. The optical apparatus according to claim 1, wherein the pressing member is elastically deformed in a radial direction of the optical apparatus to apply the pressing force to the operating member.

8. The optical apparatus according to claim 1, wherein:

the pressing member has a plurality of first contact portions that come into contact with the first contact surface and a plurality of second contact portions that come into contact with the second contact surface, and an angle through which the operating member is rotatable is restricted to a predetermined angle, and an angle obtained by multiplying the predetermined angle by the number of first contact portions or the number of second contact portions is smaller than 360 degrees.

9. The optical apparatus according to claim 8, wherein a rotation restraining unit provided in the operating member is engaged with a groove portion provided in the fixing member in a circumferential direction, and when the operating member is rotated, the rotation restraining unit abuts against an end of the groove portion to restrict the angle through which the operating member is rotatable.

* * * * *